J. F. VOGEL.
STEERING GEAR.
APPLICATION FILED OCT. 21, 1913.

1,109,718.

Patented Sept. 8, 1914.

Witnesses
H. K. Ford
James P. Barry

Inventor
Joshua F. Vogel
By Whittemore, Hulbert & Whittemore
Att'ys

THE NORRIS PETERS CO., PHOTO-LITHO., WASHINGTON, D. C.

UNITED STATES PATENT OFFICE.

JOSHUA F. VOGEL, OF TOLEDO, OHIO, ASSIGNOR TO GENDRON WHEEL COMPANY, OF TOLEDO, OHIO, A CORPORATION OF OHIO.

STEERING-GEAR.

1,109,718.

Specification of Letters Patent. Patented Sept. 8, 1914.

Application filed October 21, 1913. Serial No. 796,395.

*To all whom it may concern:*

Be it known that I, JOSHUA F. VOGEL, a citizen of the United States of America, residing at Toledo, in the county of Lucas and State of Ohio, have invented certain new and useful Improvements in Steering-Gear, of which the following is a specification, reference being had therein to the accompanying drawings.

My invention relates to steering gears and more particularly to a steering gear adapted for use on children's vehicles.

The invention has for its objects to provide a simple and efficient mechanism; and further reduce the number of connections between the steering mechanism and the vehicle.

The invention resides in the novel construction, arrangement and combination of parts as will more fully hereinafter appear.

Figure 1:
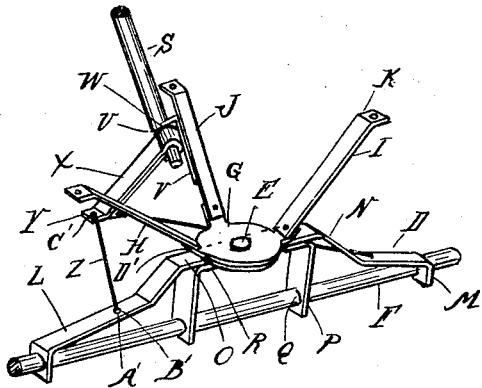
Figure 2:
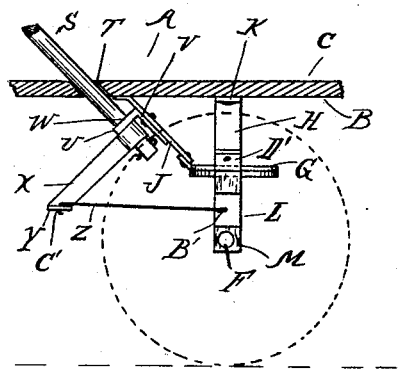

In the drawings, Figure 1 is a perspective view of a device embodying the invention; and Fig. 2 is a sectional side elevation thereof.

A supporting member which is made up of a plurality of parts, more fully described hereinafter, is adapted to be connected to the under face B of the vehicle body C and is pivotally connected to the bolster D, by means of a king bolt E. The bolster in turn is supported on the front axle F. The support is provided with a bearing portion G and with legs H I adjacent the sides of the bearing G, and a leg J extending rearwardly, the legs having bearing portions K suitably secured to the bottom C. The bolster D is formed of a truss-strap L having downwardly-extending apertured ears M through which the axle F extends, and having an upwardly bent U-shaped portion N at the center thereof, the base O of the U-shaped portion N resting upon the bearing G and free to turn thereon.

P is a U-shaped strap having apertures Q adjacent the ends of the legs thereof, and the base R of the U and the base O are pivotally connected to the bearing G by the king-bolt E which extends through alining apertures in said parts.

S is the steering stem projecting upwardly above the bottom C in operative relation to the seat, in the usual manner. This stem extends through an aperture T in the bottom C, and the aperture forms a journal for the stem S intermediate the ends thereof. The lower end of the stem S is rotatably journaled in a bearing U, and in order to reduce the number of connections between the steering mechanism and the bottom C to a minimum, this bearing is mounted upon the leg J. In the arrangement shown in the drawings the bearing U is in the form of an L-shaped member having one part V thereof riveted or otherwise suitably connected to the leg J, and having the other arm W of the L provided with an aperture within which is arranged the end of the stem S. Fixedly connected to the stem S to turn therewith is an arm X having laterally-extending flanges Y, and these flanges are respectively connected by means of rods Z to the bolster D upon opposite sides of the center of the bolster. Thus, upon the turning of the stem S the bolster is correspondingly actuated. As the arm X swings through an arc having the path of movement thereof at an angle to the path of movement of the bolster, compensation is made for these differences in movement by forming the connection Z with hook-shaped ends A' which are loosely arranged in apertures B' C' respectively in the bolster and the lugs Y. The legs H I and J are preferably formed separate from the bearing portion G, and the latter is provided with lugs D' to which the legs are riveted or otherwise suitably connected.

While I have shown and described the preferred form of my invention, it is to be understood that I do not limit the invention to the particular type of mechanism illustrated.

What I claim as my invention is:—

1. In a steering gear, the combination with a support adapted to be connected to the vehicle body, and a bolster pivotally connected to the support, of a steering stem normally supported obliquely to the vehicle body and the bolster journaled to said support, a rearwardly and downwardly extending arm secured to the stem and provided with lateral extensions, and connecting means for turning the bolster upon the turning of the steering stem.

2. In a steering gear, the combination with a support composed of a bearing and a plurality of legs adapted to be connected to the vehicle body, of a bolster arranged upon the bearing to turn thereupon, a steering stem, means secured to one of the legs to support the steering stem in alinement therewith, an arm fixed to the stem and arranged to move in an arc at an angle to the path of movement of the bolster, and connections between the arm and the bolster upon opposite sides of the pivotal connection of the latter for turning the bolster upon the turning of said steering stem.

In testimony whereof I affix my signature in presence of two witnesses.

JOSHUA F. VOGEL.

Witnesses:
 Mrs. J. SCHNEIDER,
 J. WEIR COOVER.

Copies of this patent may be obtained for five cents each, by addressing the "Commissioner of Patents, Washington, D. C."